United States Patent
Wang et al.

(10) Patent No.: US 10,953,540 B2
(45) Date of Patent: Mar. 23, 2021

(54) ROBOT CONTROL DEVICE (71) Applicant: FANUC CORPORATION, Yamanashi (JP)

(72) Inventors: Yuelai Wang, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 279 days.

(21) Appl. No.: 15/867,339

(22) Filed: Jan. 10, 2018

(65) Prior Publication Data
US 2018/0200886 A1 Jul. 19, 2018

(30) Foreign Application Priority Data
Jan. 17, 2017 (JP) .............................. JP2017-006071

(51) Int. Cl.
B25J 9/00 (2006.01)
B25J 9/16 (2006.01)
G05B 19/402 (2006.01)

(52) U.S. Cl.
CPC .......... B25J 9/1653 (2013.01); B25J 9/1692 (2013.01); B25J 9/161 (2013.01); G05B 19/402 (2013.01); G05B 2219/37605 (2013.01); G05B 2219/39054 (2013.01); G05B 2219/39056 (2013.01); Y10S 901/09 (2013.01)

(58) Field of Classification Search
CPC ........ B25J 9/1653; B25J 9/1692; B25J 9/161; B25J 9/0081; B25J 13/00; G05B 2219/39054; G05B 2219/37605; G05B 2219/39056; G05B 19/402; Y10S 901/09
See application file for complete search history.

(56) References Cited

U.S. PATENT DOCUMENTS

| 9,188,435 | B2 | 11/2015 | Sadahiro et al. | |
| 2008/0201015 | A1* | 8/2008 | Brogardh | B25J 9/1623 700/254 |
| 2012/0290260 | A1* | 11/2012 | Sadahiro | G01B 21/04 702/167 |

(Continued)

FOREIGN PATENT DOCUMENTS

| EP | 2522952 A2 | 11/2012 |
| EP | 2551069 A2 | 1/2013 |

(Continued)

OTHER PUBLICATIONS

NPL:JP2014_135068_translation (Year: 2014).*

(Continued)

Primary Examiner — Ian Jen
(74) Attorney, Agent, or Firm — Karceski IP Law, PLLC (57) ABSTRACT A robot control device includes a position-accuracy-information storage unit that stores position accuracy information at a plurality of division points defined when an operating area space of the multi joint robot is divided into a plurality of areas in a grid shape, a position-accuracy calculation unit that calculates position accuracy at the end-effector position based on the position accuracy information and the current end-effector position of the multi-joint robot, and a position-accuracy output unit that outputs the calculated position accuracy to an outside.

4 Claims, 5 Drawing Sheets (56) References Cited

U.S. PATENT DOCUMENTS

| | | | | |
|---|---|---|---|---|
| 2013/0025399 A1* | 1/2013 | Sakaki | .................. | B25J 9/1638 |
| | | | | 74/490.05 |
| 2015/0258690 A1* | 9/2015 | Naitou | .................... | G01L 5/226 |
| | | | | 700/253 |
| 2015/0363907 A1* | 12/2015 | Satoh | ........................ | G06T 7/30 |
| | | | | 382/289 |

FOREIGN PATENT DOCUMENTS

| | | |
|---|---|---|
| JP | H06083427 | 3/1994 |
| JP | H08272414 | 10/1996 |
| JP | H09-237112 A | 9/1997 |
| JP | 2003141511 A | 5/2003 |
| JP | 2009-148850 A | 7/2009 |
| JP | 2012-237620 A | 12/2012 |
| JP | 2013027939 | 2/2013 |
| JP | 2014065100 | 4/2014 |
| JP | 2014-135068 A | 7/2014 |
| JP | 2015-171747 A | 10/2015 |
| JP | 2016-002214 A | 1/2016 |

OTHER PUBLICATIONS

Japanese Office Action dated Jul. 17, 2018, for Japanese Patent Application No. 2017-006071.
German Office Action dated Feb. 19, 2020, for German Patent Application No. 10 2018 200 240.1.

* cited by examiner

| POSITION DATA | | | ACCURACY DATA | | |
|---|---|---|---|---|---|
| X | Y | Z | Ax | Ay | Az |
| X1 | Y1 | Z1 | Ax1 | Ay1 | Az1 |
| X2 | Y2 | Z2 | Ax2 | Ay2 | Az2 |
| X3 | Y3 | Z3 | Ax3 | Ay3 | Az3 |
| X4 | Y4 | Z4 | Ax4 | Ay4 | Az4 |
| ... | ... | ... | ... | ... | ... |

| POSITION DATA | | | | | | ACCURACY DATA | | |
|---|---|---|---|---|---|---|---|---|
| J1 | J2 | J3 | J4 | J5 | J6 | Ax | Ay | Az |
| J11 | J21 | J31 | J41 | J51 | J61 | Ax1 | Ay1 | Az1 |
| J12 | J22 | J32 | J42 | J52 | J62 | Ax2 | Ay2 | Az2 |
| J13 | J23 | J33 | J43 | J53 | J63 | Ax3 | Ay3 | Az3 |
| J14 | J24 | J34 | J44 | J54 | J64 | Ax4 | Ay4 | Az4 |
| ... | ... | ... | ... | ... | ... | ... | ... | ... |

FIG. 6

ROBOT CONTROL DEVICE

CROSS-REFERENCE TO RELATED APPLICATIONS

This application is based on and claims priority to Japanese Patent Application No. 2017-006071, filed on Jan. 17, 2017, the entire content of which is incorporated herein by reference.

FIELD OF THE INVENTION

The present invention relates to a robot control device.

BACKGROUND OF THE INVENTION

In a known technique in the related art, end-position information of a multi joint robot is measured with a three-dimensional-position measuring device or the like at a plurality of measuring points, and D-H (Denavit-Hartenberg) parameters, including link lengths, and the like are corrected, or the amount of distortion is corrected by calculating the distortion generated from a load torque acting on a motor of a rotation joint and adding this to a motor instruction, thereby improving the absolute accuracy of the end of the jointed robot.

For example, Japanese Unexamined Patent Application Publication No. 2014-65100 discloses a technique for calculating and collecting the amount of shift between a position instructed to a multi joint robot and the actual position thereof. Japanese Unexamined Patent Application Publication No. Hei 6-83427 discloses a technique for estimating and correcting the amount of shift due to the distortion of a joint by using a learning model.

SUMMARY OF THE INVENTION

The present invention provides the following solutions.

A first aspect of the present invention is directed to a robot control device including: a storage unit that stores position accuracy information at a plurality of division points defined when an operating area space of a multi joint robot is divided into a plurality of areas in a grid shape; a position-accuracy calculation unit that calculates, based on the position accuracy information and the current end-effector position of the multi joint robot, position accuracy at the end-effector position; and an output unit that outputs the calculated position accuracy to an outside.

A second aspect of the present invention is directed to a robot control device including: a storage unit that stores position accuracy information at a plurality of division points defined when a joint angle space of a multi-joint robot is divided; a position-accuracy calculation unit that calculates, based on the position accuracy information and the current joint angle of the multi-joint robot, position accuracy at this joint angle; and an output unit that outputs the calculated position accuracy to an outside.

DESCRIPTION OF EMBODIMENTS OF THE INVENTION

First Embodiment

A robot control device according to an embodiment of the present invention will be described in detail below with reference to the drawings.

The robot control device 1 according to this embodiment includes (not shown): a CPU (Central Processing Unit); main storage devices such as a ROM (Read Only Memory) and a RAM (Random Access Memory); an auxiliary storage device such as an HDD (Hard Disk Drive); an input/output interface to which an input/output device such as a teach pendant is connected; and an external interface via which various data is exchanged with an external device such as a robot, which are connected to one another via a bus. The auxiliary storage device stores various programs, and, as a result of the CPU reading out programs from the auxiliary storage device into the main storage device, such as the RAM, and executing the programs, various processing is performed.

Figure 1:
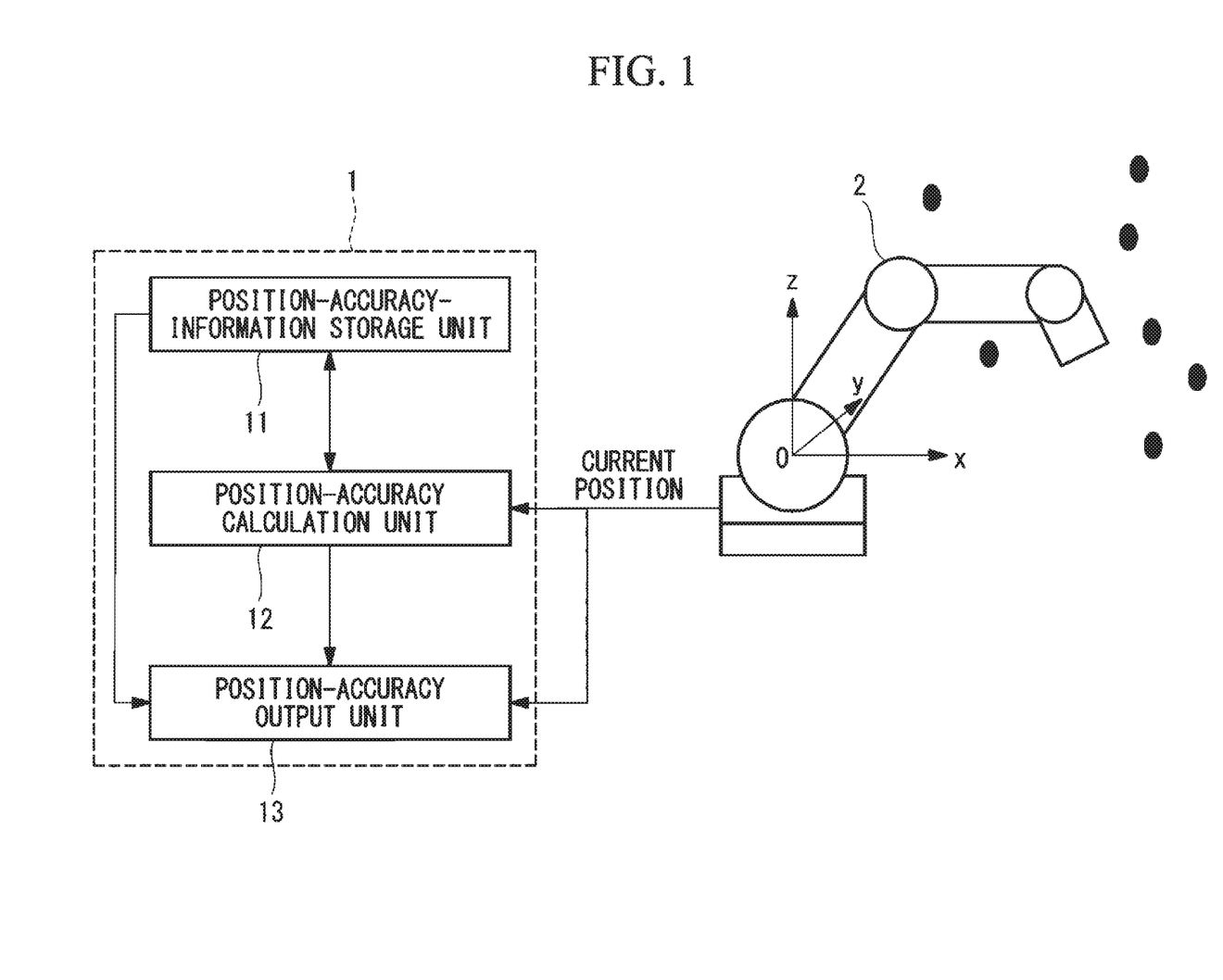
FIG. 1 is a diagram showing a schematic configuration of a robot control device according to an embodiment of the present invention.

As shown in FIG. 1, the robot control device 1 according to this embodiment includes, as functional blocks implemented by the CPU, a position-accuracy-information storage unit (storage unit) 11, a position-accuracy calculation unit 12, and a position-accuracy output unit (output unit) 13.

The position-accuracy-information storage unit 11 is connected to the position-accuracy calculation unit 12 and the position-accuracy output unit 13. The position-accuracy calculation unit 12 is connected to a multi-joint robot 2, the position-accuracy-information storage unit 11, and the position-accuracy output unit 13. The position-accuracy output unit 13 is connected to the position-accuracy-information storage unit 11, the position-accuracy calculation unit 12, and the multi-joint robot 2. A teach pendant (not shown) having a display part is connected to the position-accuracy output unit 13.

Figure 2:
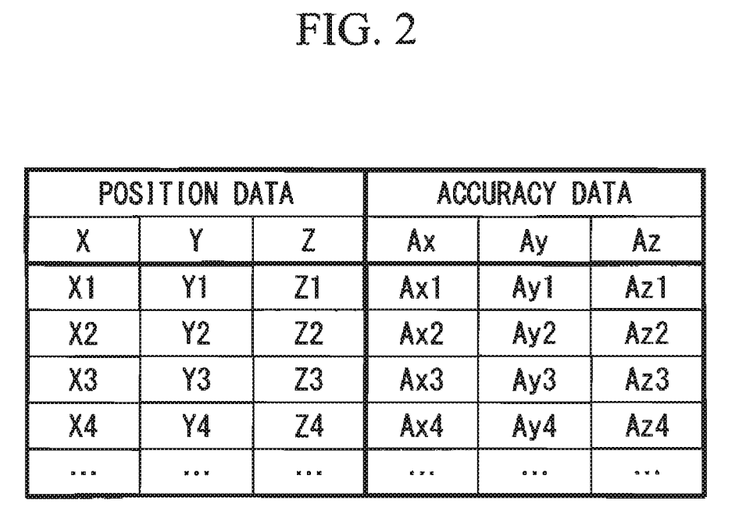
FIG. 2 is a diagram showing example position accuracy information stored in a position-accuracy-information storage unit provided in the robot control device in FIG. 1.

The position-accuracy-information storage unit 11 is formed of a portion of the above-described main storage device or auxiliary storage device and is configured to store position accuracy data (position accuracy information) at respective grid points (division points) defined by dividing the overall operating area of the multi-joint robot 2 in a grid shape. As shown in FIG. 2, the position accuracy data is stored in the form of a position accuracy table in which the position data and the accuracy data are associated with each other. The position data is three-dimensional coordinate values of the respective grid points based on a robot coordinate system fixed with respect to the multi-joint robot 2. The accuracy data is a value obtained by, when one grid point is assumed to be an instruction position, subtracting the instruction position from the actual end-effector position of the multi-joint robot 2 that has moved according to the instruction, that is, a difference value. The accuracy data is calculated with respect to all the grid points in advance and is stored in the position accuracy table. The actual end-effector position of the multi-joint robot 2 may be measured with a three-dimensional measuring sensor.

More specifically, the position accuracy data (Ax, Ay, Az) at each grid point is calculated from an instruction position (Cx, Cy, Cz) to the multi-joint robot 2 and an output (Mx, My, Mz) of the three-dimensional measuring sensor, by using Expressions (1) to (3) below:

$$Ax = Mx - Cx \quad (1)$$

$$Ay = My - Cy \quad (2)$$

$$Az = Mz - Cz \quad (3)$$

The intervals between the respective grid points do not need to be equal. For example, in an area where the variation in the accuracy data is large, the grid intervals may be reduced, whereas in an area where the variation in the accuracy data is small, the grid intervals may be increased. By doing so, it is possible to obtain accurate position accuracy data while keeping the storage capacity used by the position-accuracy-information storage unit 11 low.

The position-accuracy calculation unit 12 is configured to calculate the position accuracy at the current end-effector position of the multi-joint robot 2 on the basis of the information about the current end-effector position received from the multi-joint robot 2 and the position accuracy data stored in the position-accuracy-information storage unit 11. The position accuracy at the current end-effector position may be calculated from position accuracy data at nearby grid points by using a typical known interpolation method, and for example, it may be calculated from the position accuracy data at eight grid points near the current end-effector position by linear interpolation.

The position-accuracy output unit 13 is configured to output, to the display D (also referred to as "the display part" herein) of the teach pendant, the current position information received from the multi joint robot 2, the position accuracy of the current position of the multi joint robot 2 calculated by the position-accuracy calculation unit 12, and the position accuracy data of the respective grid points stored in the position-accuracy-information storage unit 11.

Figure 3:
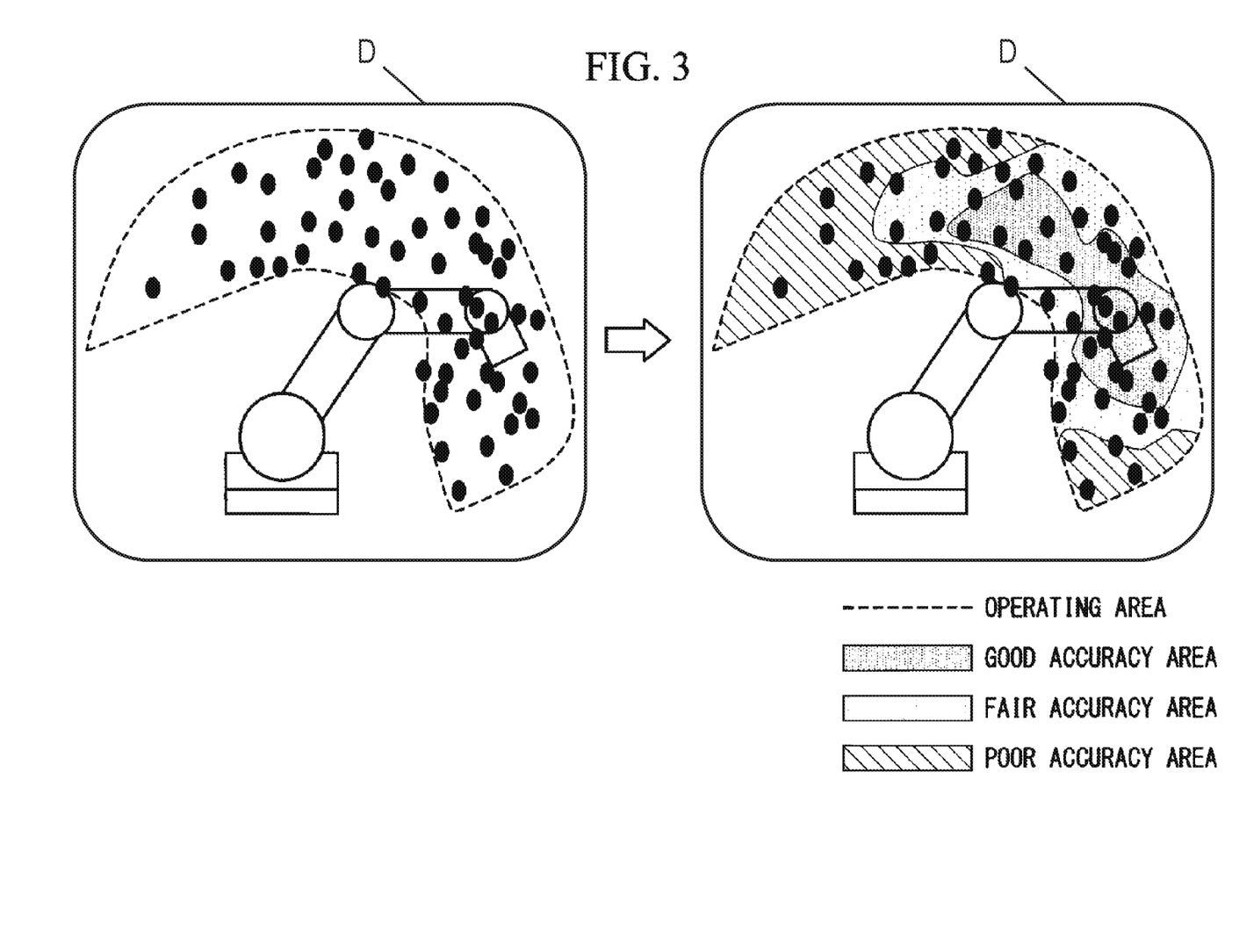
FIG. 3 is a diagram explaining map display of the position accuracy information.

As shown in FIG. 3, the position-accuracy output unit 13 is configured to output the operating area space of the multi-joint robot 2 such that it is divided into three areas, namely, a "good accuracy area", a "fair accuracy area", and a "poor accuracy area", on the basis of the position accuracy data of the respective grid points stored in the position-accuracy-information storage unit 11.

In the example shown in FIG. 3, a fine dot pattern area shows the "good accuracy area", a coarse dot pattern area shows the "fair accuracy area", and a hatched area shows the "poor accuracy area".

Figure 4:
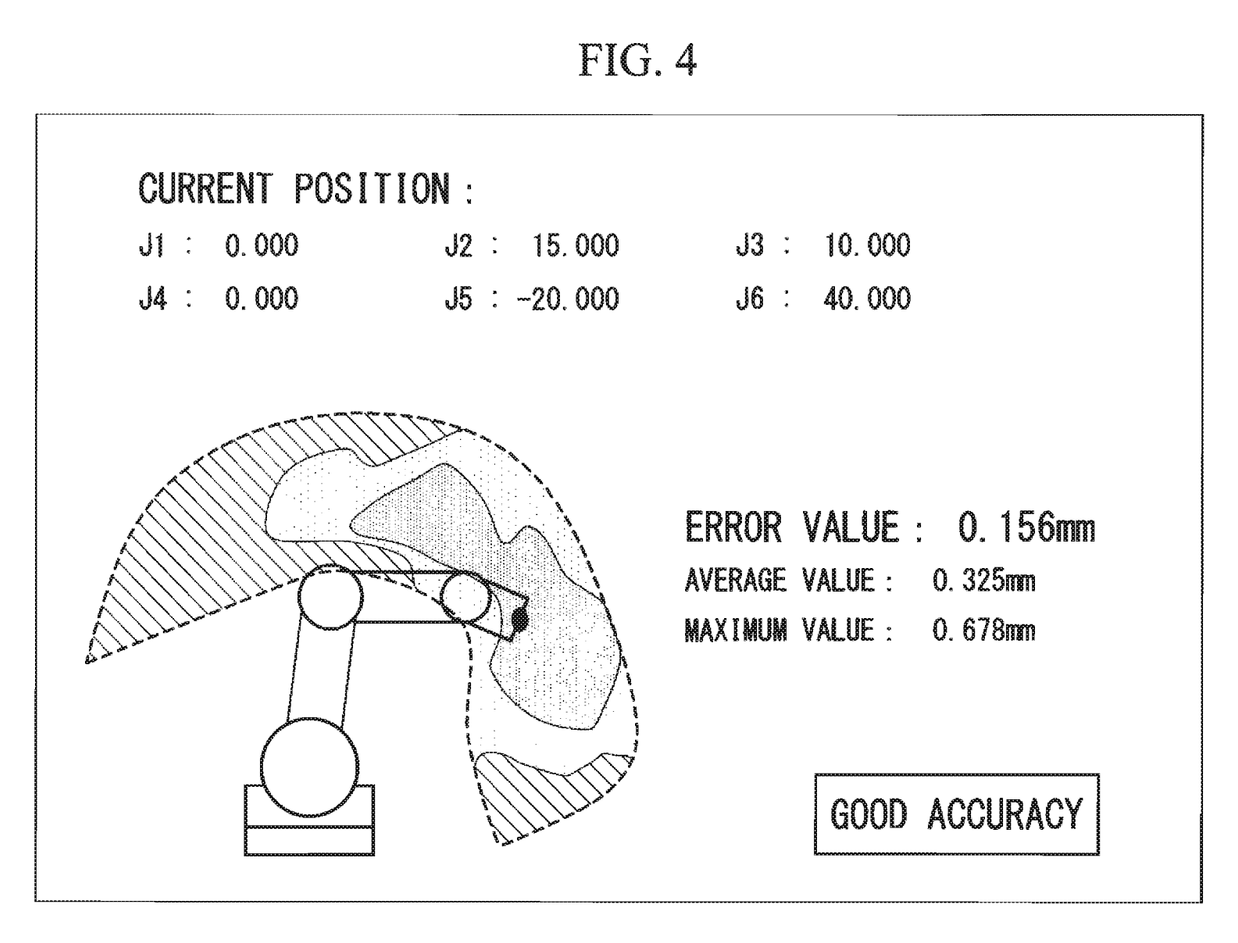
FIG. 4 is a diagram explaining a display output by a position-accuracy output unit provided in the robot control device in FIG. 1.

Furthermore, as shown in FIG. 4, the position-accuracy output unit 13 in this embodiment displays, on the display part of the teach pendant, the angles of the respective shafts at the current position of the multi-joint robot 2; an error value, an average value, and a maximum value with respect to the current position; a map of the overall operating area in which the distribution of the position accuracy data is divided into three areas according to the accuracy thereof; and a character string showing the area, among the three areas, to which the position accuracy at the current end-effector position belongs. In the example shown in FIG. 4, because the end-effector position of the multi joint robot 2 is within the "good accuracy area", a character string "good accuracy" is displayed.

Next, processing performed by the thus-configured robot control device 1 will be described with reference to FIGS. 1 and 6. Before the following processing is performed, calibration is performed on the multi joint robot 2 in advance to improve the absolute position accuracy.

Figure 6:
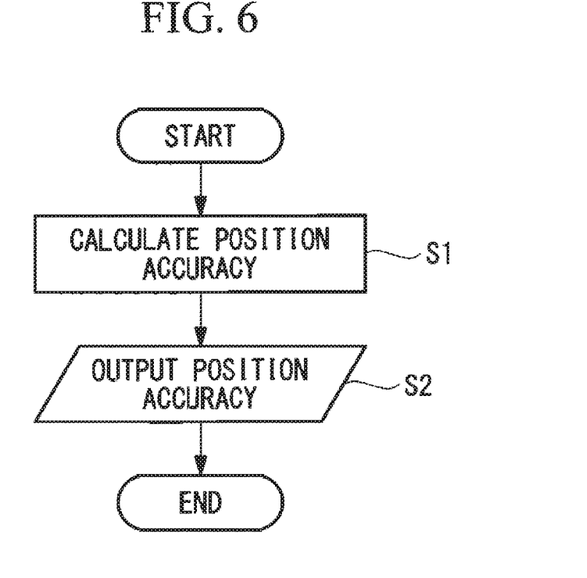
FIG. 6 is a flowchart showing processing performed by the robot control device in FIG. 1.

First, the position-accuracy calculation unit 12 calculates the position accuracy at the current end-effector position of the multi-joint robot 2, taught by a teacher, from the position accuracy data stored in the position-accuracy-information storage unit 11 (step S1 in FIG. 6).

The position-accuracy output unit 13 outputs, to the display part of the teach pendant, the current position, the position accuracy at the current position calculated in the position-accuracy calculation unit 12, and map display of the position accuracy data stored in the position-accuracy-information storage unit 11 (step S2 in FIG. 6).

As described above, because the robot control device 1 according to this embodiment can immediately indicate, to the teacher, the accuracy information at the current position of the multi-joint robot 2, ease of teaching performed by the teacher improves. When the teacher judges, based on the indicated position accuracy information, that the accuracy at the teach position is not good, he/she can teach while avoiding the position where the accuracy is not good by changing the position of the workpiece or by changing the installation position of the multi-joint robot 2. Furthermore, the teacher can perform a calibration operation again with respect to the area for which he/she judged that the accuracy was not good.

Second Embodiment

Next, a second embodiment will be described. The second embodiment differs from the first embodiment in that the position accuracy data at a plurality of division points defined when the joint angle space of the multi joint robot 2 is divided is stored in the position-accuracy-information storage unit 11. The difference from the first embodiment will be mainly described below.

Figure 5:
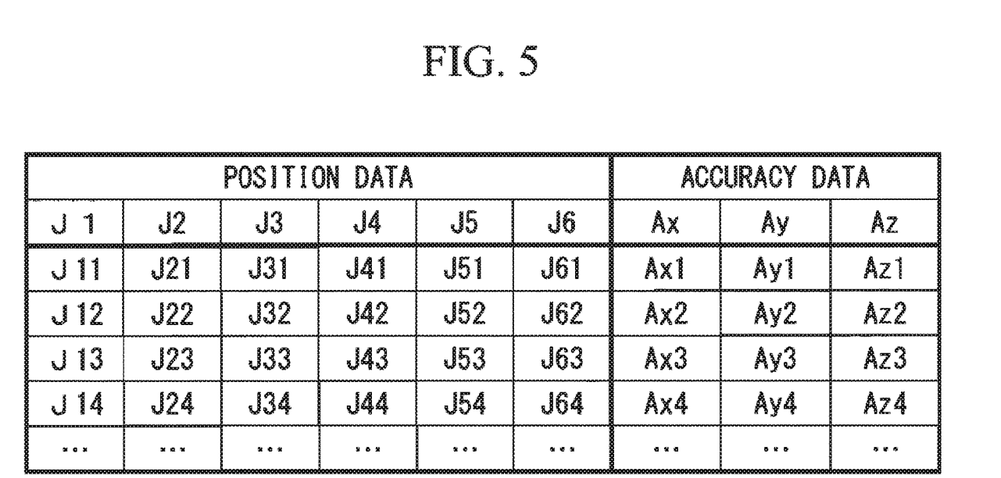
FIG. 5 is a diagram showing example position accuracy information stored in the position-accuracy-information storage unit provided in the robot control device shown in FIG. 1.

As shown in FIG. 5, the position accuracy data stored in the position-accuracy-information storage unit 11 in this embodiment is stored in the form of a position accuracy table in which the position data of the division points in the joint angle space is associated with the accuracy data. The position data is expressed as the joint angles of the joint shafts J1 to J6 of the multi-joint robot 2. The accuracy data is a value obtained by, when one division point is assumed to be an instruction angle, subtracting the end-effector position determined by the instruction angle from the actual end-effector position of the multi-joint robot 2 that has moved according to the instruction. The accuracy data is preliminarily calculated with respect to all the division points and is stored in the position accuracy table.

In FIG. 5, although the position accuracy data of the respective division points in the joint angle space formed by the joint shafts J1 to J6 is stored in the position accuracy table, elements in which the variation in the accuracy data is small may be omitted. For example, when the influence of the joint shafts J4 to J6 on the accuracy of the posture is small, by dividing the joint angle space formed by the joint shafts J1 to J3 into a grid shape and storing only the position accuracy data at the respective division points in the position accuracy table, it is possible to keep the storage capacity used by the position-accuracy-information storage unit 11 low.

The position-accuracy calculation unit 12 in this embodiment is configured to calculate the accuracy information at the current position of the multi-joint robot 2 based on the current joint angle information received from the multi-joint robot 2 and the position accuracy data stored in the position-accuracy-information storage unit 11. The accuracy information at the current position can be calculated from the position accuracy data at nearby division points by using a typical known interpolation method.

As described above, in this embodiment, because the position accuracy data stored in the position-accuracy-information storage unit 11 is based on the joint angle space, and because it is possible to show a teacher the accuracy information at the current position of the multi-joint robot 2 calculated therefrom, the teacher can teach while avoiding the vicinity of the singular point where the accuracy decreases.

Although the embodiments of the present invention have been described above in detail above with reference to the drawings, the detailed configurations are not limited to those in the embodiments, and also include design changes, etc. that do not depart from the scope of the present invention.

For example, in the above-described embodiments, although the accuracy data in the position accuracy table is stored in the form of the respective X, Y, and Z components, the form is not limited thereto, and the accuracy data may be stored in another form.

In the above-described embodiment, although the output destination to which the position-accuracy output unit 13 outputs the position accuracy is the display part of the teach pendant, the output destination is not limited thereto and may be another external output device that can be connected to the robot control device 1.

As a result, the above-described embodiments lead to the following aspects.

A first aspect of the present invention is directed to a robot control device including: a storage unit that stores position accuracy information at a plurality of division points defined when an operating area space of a multi joint robot is divided into a plurality of areas in a grid shape; a position-accuracy calculation unit that calculates, based on the position accuracy information and the current end-effector position of the multi joint robot, position accuracy at the end-effector position; and an output unit that outputs the calculated position accuracy to an outside.

In the robot control device according to the first aspect, the position accuracy at the end-effector position is calculated by the position-accuracy calculation unit based on the position accuracy information at a plurality of division points preliminarily stored in the storage unit and the current end-effector position of the multi-joint robot. Then, the calculated position accuracy is output to the outside by the output unit.

Because this configuration enables the position accuracy at the current end-effector position of the multi-joint robot to be immediately indicated to a teacher, it is possible to improve the ease of teaching performed by the teacher. When the teacher judges, based on the indicated position accuracy information, that the accuracy at the teach position is not good, the teacher can teach while avoiding the position where the accuracy is not good by changing the position of the workpiece or by changing the installation position of the multi joint robot. Furthermore, the teacher can perform a calibration operation again with respect to the area for which he/she judged that the accuracy was not good.

In the robot control device according to the first aspect, the output unit may be configured to output, as a form of a map, the distribution of a plurality of items of the position accuracy information stored in the storage unit.

This configuration enables the teacher to obtain an overview of the distribution of the position accuracy information in the operating area space of the multi-joint robot. Hence, it is possible to further improve ease of teaching performed by the teacher.

A second aspect of the present invention is directed to a robot control device including: a storage unit that stores position accuracy information at a plurality of division points defined when a joint angle space of a multi-joint robot is divided; a position-accuracy calculation unit that calculates, based on the position accuracy information and the current joint angle of the multi-joint robot, position accuracy at this joint angle; and an output unit that outputs the calculated position accuracy to an outside.

In the robot control device according to the second aspect, based on the position accuracy information at a plurality of division points defined when the joint angle space is divided, the information being preliminarily stored in the storage unit, and the current end-effector position of the multi-joint robot, the position accuracy at this end-effector position is calculated by the position-accuracy calculation unit. Then, the calculated position accuracy is output to the outside by the output unit.

As described above, because the position accuracy information stored in the storage unit is based on the joint angle space, and because it is possible to indicate, to the teacher, the position accuracy information at the current end-effector position of the multi joint robot calculated therefrom, the teacher can teach while avoiding the vicinity of the singular point where the accuracy decreases. As a result, it is possible to improve the ease of teaching performed by the teacher.

In the robot control device according to the first or second aspect, the position accuracy information may include a difference value between the actual position of the multi-joint robot that has been measured in advance and an instructed position.

The present invention provides an advantage in that it is possible to improve the ease of teaching when teaching a multi-joint robot.

The invention claimed is:

1. A robot control device comprising:
    a storage that stores position accuracy information at a plurality of division points defined when an operating area space of a multi joint robot is divided into a plurality of areas in a grid shape;
    a position-accuracy calculator, connected to the storage, that calculates, based on the position accuracy information and a current end-effector position of the multi-joint robot, position accuracy at the current end-effector position; and
    an output, connected to the position-accuracy calculator and to a display, that outputs the calculated position accuracy to the display and also outputs to the display, as a map, a distribution of the position accuracy information stored in the storage, showing regions of at least good accuracy and poor accuracy.

2. A robot control device comprising:
    a storage that stores position accuracy information at a plurality of division points defined when a joint angle space of a multi joint robot is divided;
    a position-accuracy calculator, connected to the storage, that calculates, based on the position accuracy information and a current joint angle of the multi joint robot, position accuracy at the current joint angle; and
    an output, connected to the position-accuracy calculator and to a display, that outputs the calculated position accuracy to the display and also outputs to the display, as a map, a distribution of the position accuracy information stored in the storage, showing regions of at least good accuracy and poor accuracy.

3. The robot control device according to claim 1, wherein the position accuracy information comprises a difference value between an actual position of the multi joint robot that has been measured in advance and an instructed position.

4. The robot control device according to claim 2, wherein the position accuracy information comprises a difference value between an actual joint angle of the multi joint robot that has been measured in advance and an instructed joint angle.

* * * * *